United States Patent
Yoon et al.

(10) Patent No.: US 8,633,421 B2
(45) Date of Patent: Jan. 21, 2014

(54) LASER PROCESSING APPARATUS AND METHOD

(75) Inventors: Do Young Yoon, Yongin (KR); Gi Lyong Na, Hwaseong (KR); Young Jin Jun, Suwon (KR)

(73) Assignee: Samsung Electro-Mechanics Co., Ltd., Suwon, Gyunggi-do (KR)

(*) Notice: Subject to any disclaimer, the term of this patent is extended or adjusted under 35 U.S.C. 154(b) by 1201 days.

(21) Appl. No.: 12/334,429

(22) Filed: Dec. 12, 2008

(65) Prior Publication Data

US 2010/0039680 A1 Feb. 18, 2010

(30) Foreign Application Priority Data

Aug. 13, 2008 (KR) .......................... 10-2008-0079453

(51) Int. Cl.
*B23K 26/00* (2006.01)
*B23K 26/08* (2006.01)

(52) U.S. Cl.
USPC .................................. 219/121.7; 219/121.78

(58) Field of Classification Search
USPC .......................................... 219/121.6–121.83
See application file for complete search history.

(56) References Cited

U.S. PATENT DOCUMENTS

| 5,690,846 | A  | * | 11/1997 | Okada et al. ............. 219/121.78 |
| 6,869,749 | B2 | * | 3/2005  | Hayashi et al. ................ 430/290 |
| 6,972,393 | B2 | * | 12/2005 | Nagatoshi et al. ........ 219/121.76 |
| 6,984,802 | B2 | * | 1/2006  | Kuroiwa et al. .......... 219/121.73 |
| 7,456,372 | B2 | * | 11/2008 | Hiramatsu ................. 219/121.7 |
| 7,642,482 | B2 | * | 1/2010  | Takami et al. ............ 219/121.65 |
| 2008/0044059 | A1 |   | 2/2008  | Kotler et al. |

FOREIGN PATENT DOCUMENTS

| JP | 11-267868 A | 10/1999 |
| JP | 2003060356 A | 2/2003 |
| JP | 2004-066323 | 3/2004 |
| JP | 2006-346738 A | 12/2006 |
| JP | 2008-078464 A | 4/2008 |
| KR | 0520899 | 8/2004 |

* cited by examiner

*Primary Examiner* — Sang Y Paik (74) *Attorney, Agent, or Firm* — McDermott Will & Emery LLP (57) ABSTRACT

A laser processing apparatus includes a stage unit moving a substrate having a plurality of work sections along longitudinal and lateral axes and rotating the substrate at a predetermined angle about a rotational axis, a laser beam oscillating unit oscillating laser beams to process holes in the substrate, a camera unit taking and providing an image of each of the work sections, and a controller correcting a processing location data using the image taken by the camera unit to allow the laser oscillating unit and the scanner unit to accurately process the holes in the substrate.

5 Claims, 6 Drawing Sheets

LASER PROCESSING APPARATUS AND METHOD

CROSS-REFERENCE TO RELATED APPLICATIONS

This application claims the priority of Korean Patent Application No. 10-2008-0079453 filed on Aug. 13, 2008 in the Korean Intellectual Property Office, the disclosure of which is incorporated herein by reference.

BACKGROUND OF THE INVENTION

1. Field of the Invention

The present invention relates to a laser processing apparatus and method, and more particularly, to a layer processing apparatus and method that can process a hole at an accurate location of a substrate using a laser.

2. Description of the Related Art

In general, a plurality of holes such as via-holes for electric connection between substrates are formed on the substrates.

At this point, thousands to hundreds of thousands of the holes are formed on the substrate. A laser processing apparatus has been most widely used to form many holes on the substrate.

The laser processing apparatus uses a layer processing method including disposing the substrate on the stage, adjusting an angle of the substrate to emit laser beams using a scanner unit, and processing the holes on desired locations in accordance with processing location data that are preset. This method has an advantage of more quickly accurately forming the holes on the substrate as compared with other methods.

However, even when the laser processing method is used, the forming of the holes at the accurate locations is not still enough. A location error of the holes frequently occurs due to a variety of factors.

At this point, one of major factors causing the location error is a case where the preset processing location data are different from the locations of the holes that will be actually formed on the substrate. This occurs as the locations of the holes that will be processed vary due to contraction and expansion of the substrate in a direction by heat and pressure generated during a process for forming a pattern on the substrate.

In addition, the substrate must be accurately moved to a reference point of the processing location data. However, since there is an error due to mechanical limitations of a stage apparatus and when a control value of a laser scanner is not accurate, the error may occur.

As a result, when the processing error with respect to the hole locations occurs, the reliability of the products is deteriorated. In the worst case, the holes may be processed at totally undesired locations and thus the products may not be used.

Therefore, in the processing apparatus and method using the laser processing apparatus, there is a need for techniques that can process holes at accurate locations on the substrate by correcting the error caused by the above-described factors.

SUMMARY OF THE INVENTION

An aspect of the present invention provides a laser processing apparatus and method that can accurately process holes on a substrate by correcting a location error of the holes when the holes are processed on the substrate.

According to an aspect of the present invention, there is provided a laser processing apparatus including: a stage unit moving a substrate having a plurality of work sections along longitudinal and lateral axes and rotating the substrate at a predetermined angle about a rotational axis; a laser beam oscillating unit oscillating laser beams to process holes in the substrate; a camera unit taking and providing an image of each of the work sections; and a controller correcting a processing location data using the image taken by the camera unit to allow the laser oscillating unit and the scanner unit to accurately process the holes in the substrate.

The controller may control the camera unit such that the camera unit takes an image of test holes formed in a dummy region besides the work sections of the substrate and correct an error of the scanner unit using the test hole images taken.

The scanner unit may include a first optical unit located at a laser beam path and directing the laser beams to a desired path, a laser scanner reflecting the laser beams passing through the first optical unit so that the laser beams can be directed toward the substrate, and a second optical unit converting an angle of the laser beams reflected from the laser scanner into an angle that is perpendicular to the substrate.

The laser scanner may include one of a Galvano mirror, a polygon mirror, and a digital mirror.

The camera unit may include a plurality of cameras that respectively correspond to some of the work sections to simultaneously take images of the respecting corresponding work sections.

However, the camera unit is not limited to the above configuration. The camera unit may include only one camera to sequentially take images of the work section.

According to another aspect of the present invention, there is provided a laser processing method including: moving a substrate having a plurality of work sections such that a camera unit can take an image of an object work section in the substrate, which will be processed; correcting a processing location data corresponding to the object work section according to the image taken by the camera unit; and processing a hole in the object work section by controlling a laser oscillating unit and a scanner unit in accordance with the corrected processing location data.

The laser processing method may further include correcting a location of the substrate by verifying an initial location of the work section using the image taken by the camera unit.

The laser processing method may further include processing test holes in a dummy region of the substrate using the scanner unit; and correcting an error of the scanner unit by comparing an image of locations of the test holes, which is taken by the camera unit, with desired location.

The correcting of the processing location data of the object processing section is performed by comparing a pattern formed on the object work section in the image with an initially designed pattern of the substrate.

The processing of the holes in the object work section includes: defining a work section adjacent to a current work section in which the holes are being processed as the object work section; and determining if all of the work sections are processed.

When it is determined that any one of the work sections is not processed, an image of the defined object work section may be taken to correct the processing location data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
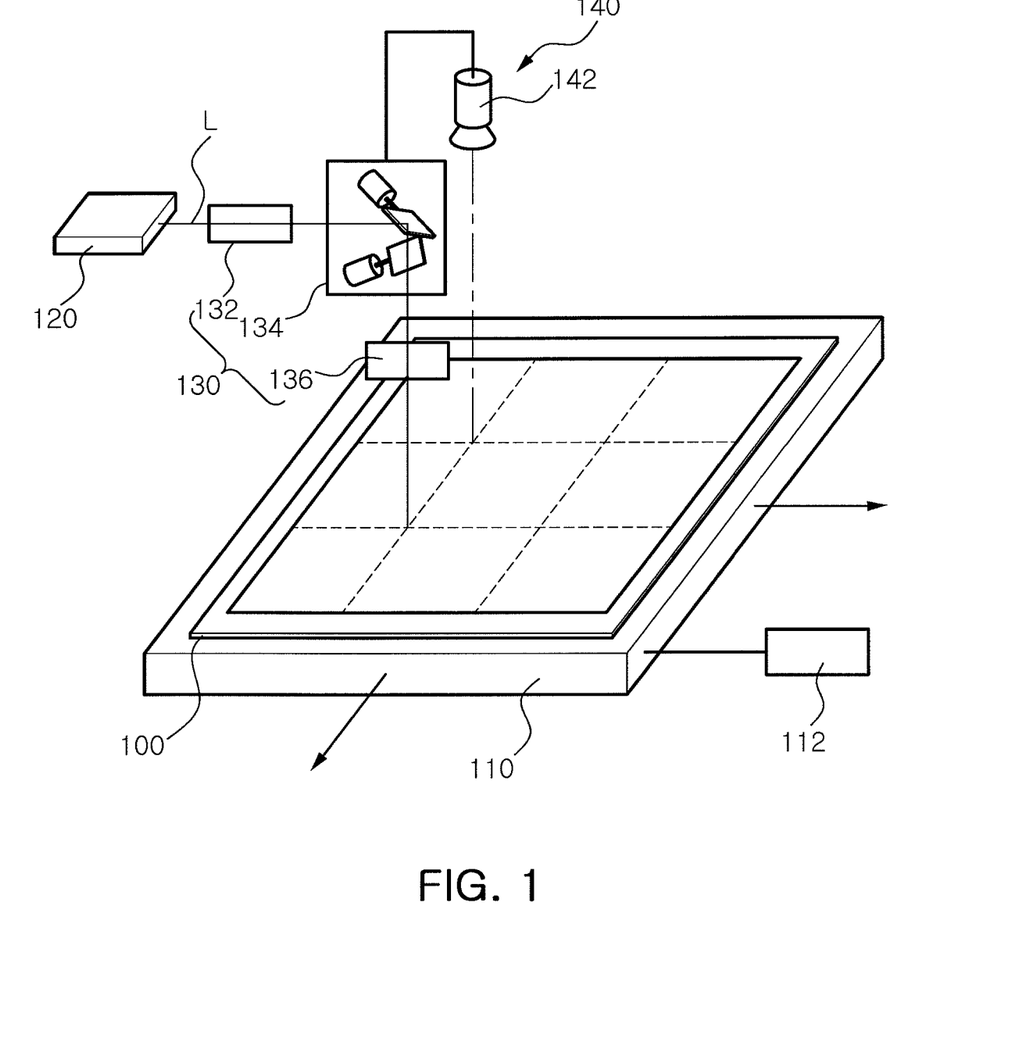
FIG. 1 is a schematic view of a laser processing apparatus according to an embodiment of the present invention.

FIG. 1 is a schematic view of a laser processing apparatus according to an embodiment of the present invention; Referring to FIG. 1, a laser processing apparatus includes a stage unit 110, a laser beam oscillating unit 120, a scanner unit 130, and a camera unit 140.

A substrate 100 is disposed on the stage unit 110. The stage unit 110 is electrically connected to a stage driving unit 112.

Here, the stage driving unit 112 may be structured to move the stage unit 110 in directions of X and Y axes. The stage driving unit 112 may be also structured to move the stage unit 110 to horizontally rotate at a predetermined angle.

Therefore, the stage unit 110 that can move in the directions of the X and Y axes by the stage driving unit 112 moves the substrate 100 disposed thereon to a working location where the scanner unit 130 is located or an image pickup location where the camera unit 140 is located.

The laser beam oscillating unit 120 generates laser beams L and oscillates the generated laser beams L in a direction. The laser beams L oscillated in the direction sequentially passes through a first optical unit 132, a laser scanner 134, and a second optical unit 136 to be converted into laser beams for processing the holes in the substrate 100.

Therefore, the laser beams L emitted from the laser beam oscillating unit 120 travel toward the substrate 100 to function to form the holes in the substrate 100.

The scanner unit 130 is located on a laser beam path of the laser beams L emitted from the laser oscillating unit 120. The scanner unit 130 includes the first optical unit 132, the laser scanner 134, and the second optical unit 136.

The first optical unit 132 is located between the laser beam oscillating unit 120 and the laser scanner 134 on the laser beam path. The first optical unit 132 directs the laser beams to a desired path and functions to adjust the laser beams generated from the laser oscillating unit 120 into a desired spot size without the beam loss.

The first optical unit 132 includes a beam expander for expanding the laser beam L into collimated light having a predetermined diameter and a homogenizer for reducing coherence of the laser beams. However, the present invention is not limited to this configuration. Any structures having the same functions will be possible.

The laser scanner 134 reflects the laser beams passing through the first optical unit 132 so that the laser beams L can be directed toward the substrate.

The laser scanner 134 changes a beam's traveling direction using a Galvano mirror. That is, by adjusting an angle of the Galvano mirror in accordance with a designer's intension, the beam's traveling direction can be changed to a desired direction.

In this embodiment, two Galvano mirrors are used to change the beam's traveling direction. Alternatively, one of polygon and digital mirrors may be used.

The laser scanner 134 is electrically connected to a scanner controller (not shown) for controlling a value for changing the angle of the Galvano mirror.

Accordingly, after test holes 102 are formed in a dummy region of the substrate 100, an image of the dummy region where the test holes 102 are formed is taken. The test holes 102 are compared with pre-designed processing locations of the holes through the image taken.

The scanner controller (not shown) controls an error between the locations of the actually formed test holes 102 and the actual intension holes and varies the control value of the laser scanner 134.

The second optical unit 136 is disposed between the laser scanner 134 and the substrate 100. The second optical unit 136 converts an angle of the laser beams reflected from the laser scanner 134 into an angle that is perpendicular to the substrate 100. In addition, the second optical unit 136 functions to changes a spot size of the laser beams into a desired spot size.

In addition, the second optical unit 136 includes a fθ lens and a micro-mirror. However, the present invention is not limited to this. That is, any structures having the same function will be possible.

The camera unit 140 is spaced apart from the scanner unit 130 by a predetermined distance and functions to pick up an image of the work region on the substrate 100.

The work region on the substrate 100 divided into a plurality of work sections, the number of which is determined depending on a size of an operation region of the scanner unit 130. The number of the work sections of the work region is not specifically limited but is defined in accordance with the designer's intension.

Further, the camera unit 140 includes a first image pick-up camera 142. The first image pick-up camera 142 is spaced apart from the scanner unit 130 such that, when one work section of the work region of the substrate 100 is located on a work location, the first image pick-up camera 142 can take an image of an adjacent section of the work region.

The scanner unit 130 and the camera unit 140 may be spaced apart from each other by a distance different from that shown in FIG. 1 in accordance with the designer's intension. In addition, the camera unit may not be a stationary structure but a movable structure so that it can move to a desired location.

Figure 2:
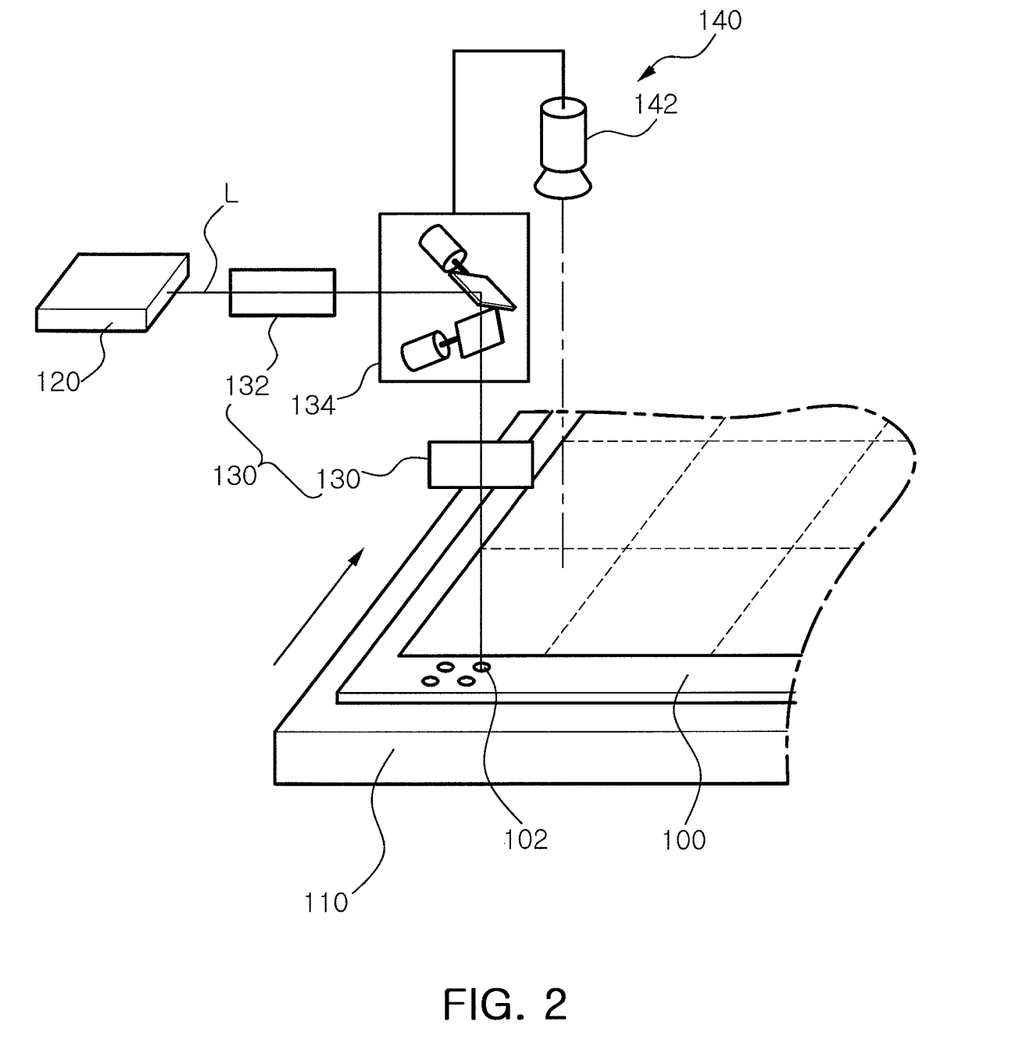
FIGS. 2 and 3 are schematic views illustrating a process of test holes in the laser processing apparatus of FIG. 1.
Figure 3:
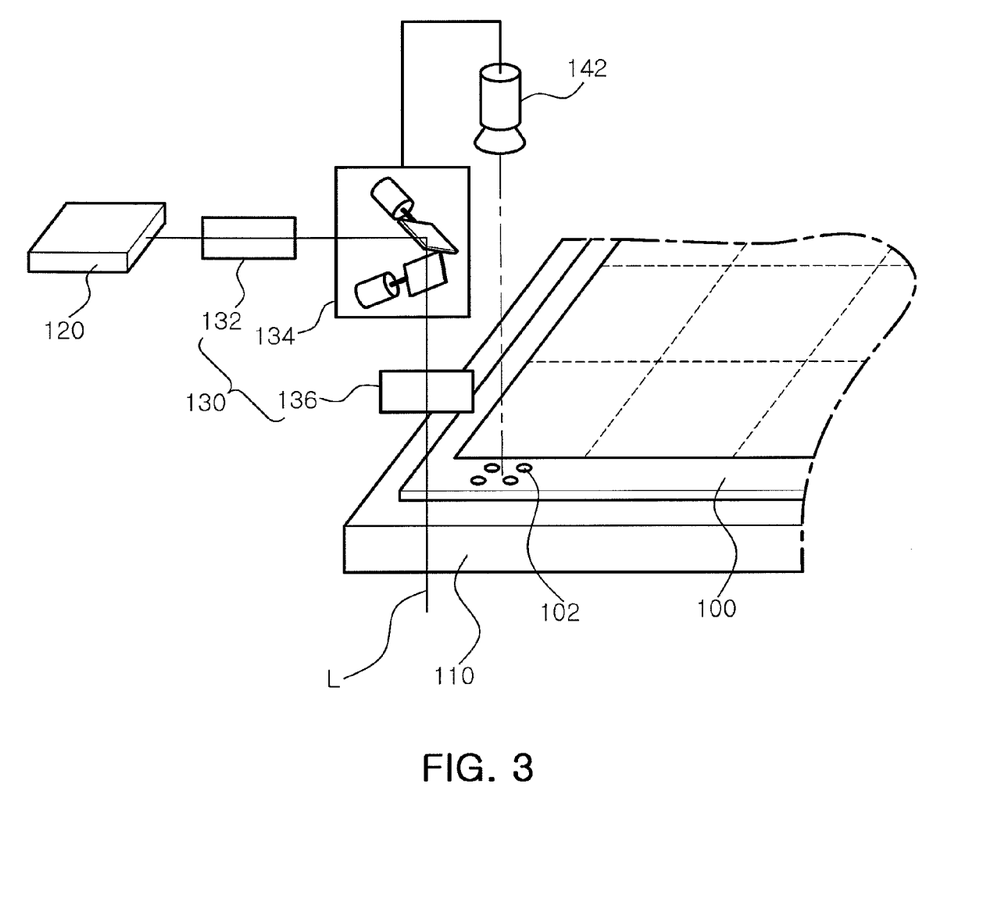

FIGS. 2 and 3 are schematic views illustrating forming of the test holes in the laser processing apparatus of FIG. 1.

Referring to FIGS. 2 and 3, the stage unit 110 moves such that the dummy region of the substrate 100 can be positioned at the work location of the scanner unit 130. Here, the dummy region means that a marginal region that is not actually used in the substrate 100.

Subsequently, the scanner unit 130 forms the test holes 102 in the dummy region of the substrate 100 and moves the stage unit such that the dummy region of the substrate 100 is positioned at a location where the camera unit 140 can take the image.

At this point, when the dummy region of the substrate 100 is positioned at the location where the camera unit 140 can take the image, the camera unit 140 takes the image of the dummy region where four test holes 102 are formed.

In addition, it is determined by comparing the locations of the test holes 102 with the desired locations of the holes through the image taken if there is any hole location error. When it is determined that there is a hole location error, this information is transferred to the scanner controller (not shown) to correct the hole location error.

Through the above-described processes, the scanner controller corrects the control value to vary the angle of the Galvano mirror in accordance with the degree of the error.

Figure 4:
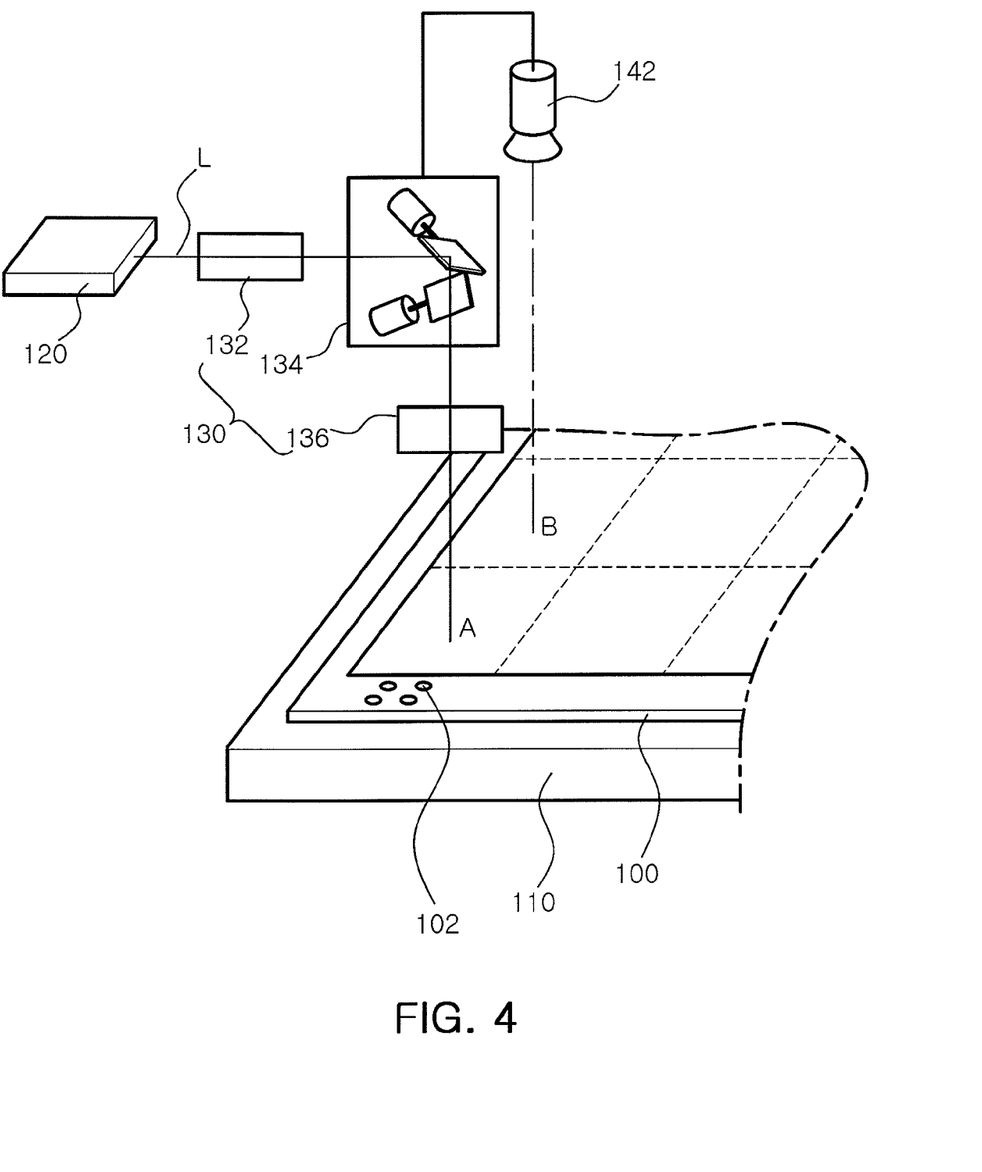
FIG. 4 is a schematic view of the scanner unit and camera unit of the laser processing apparatus of FIGS. 1 and 2.

FIG. 4 is a schematic view of the scanner unit and camera unit of the laser processing apparatus of FIGS. 1 and 2.

Referring to FIG. 4, after the test holes 102 is formed in the dummy region of the substrate 100 and the error is corrected by the scanner controller, the state unit 110 moves along the X and Y axes such that the stage unit 110 can be positioned at the work location with respect to the work region of the substrate 100.

Further, when the scanner unit 130 is positioned at one work section A of the work region, a controller (not shown) for controlling the laser processing apparatus outputs a hole processing signal and thus the scanner unit 130 starts processing the holes.

In addition, the controller defines another section B adjacent to the current section A as an object work section and thus the first image pick-up camera 142 takes an image of the object work section B. The processing location data is corrected with reference to the image taken.

Here, in FIG. 4, although the processing work section A and the object work section B are adjacent to each other, the present invention is not limited to this.

Further, the processing location data means a pre-designed data about the locations of the holes that will be formed on the substrate 100. The stage unit 110 moves in accordance with the command to the holes location, which is formed by the processing location data before the processing of the hole in the work section.

In addition, the processing work section means a work section of the substrate 100, which is set to process the holes using the scanner unit 130. The object work section means a work section of the substrate, which is for correcting the processing location data.

In FIG. 4, the scanner unit 130 and the camera unit 140 are spaced apart from each other to be located at different work sections. However, the spacing between the scanner unit 130 and the camera unit 140 is not specifically limited but may vary in accordance with the designer's intension.

The reason for locating the scanner unit 130 and the camera unit 140 at different work sections is to allow the camera unit 140 to take an image of the object work section B when the scanner unit 130 is located at the processing work section A.

Accordingly, as the scanner unit 130 processes the holes in the processing work section A, the camera unit 140 takes an image of the object work section B to correct the processing location error. As a result, the work time can be reduced.

Figure 5:
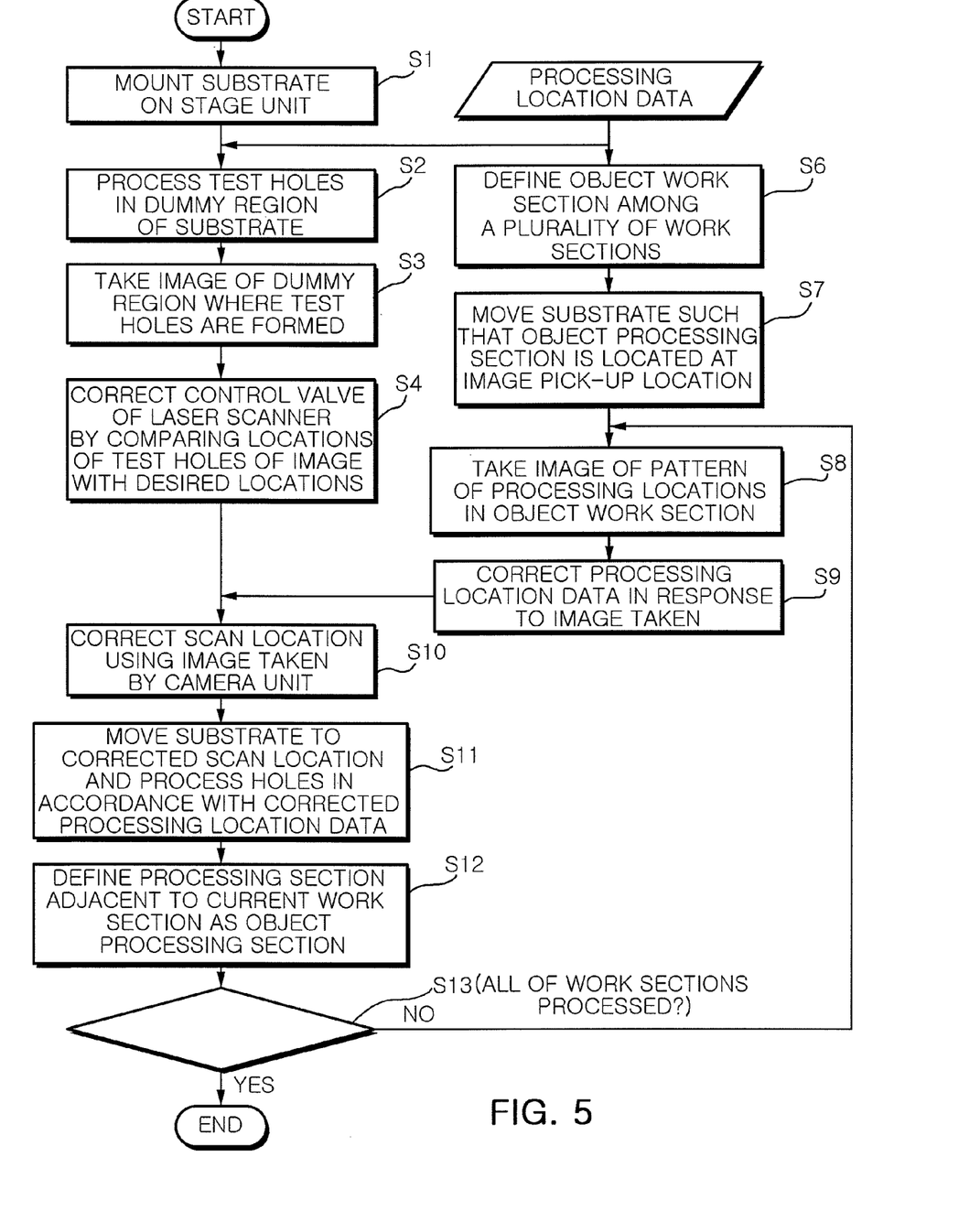
FIG. 5 is a flowchart illustrating a laser processing method according to another embodiment of the present invention.

FIG. 5 is a flowchart illustrating a laser processing method according to another embodiment of the present invention.

Referring to FIG. 5, the substrate 100 is fixedly mounted on the state unit 100 (S1).

The stage unit 110 moves such that the substrate 100 is positioned at a work location of the scanner unit 130 and the test holes in the dummy region of the substrate 100 is processed by the scanner unit 130 (S2).

After the test holes are processed in the dummy region of the substrate 100, the stage unit 110 moves such that the dummy region of the substrate 100 is positioned at the image pick-up location of the first image pick-up camera 142.

Further, the first image pick-up camera 142 takes an image of the dummy region in which the test holes 102 are formed (S3).

Accordingly, since the scanner controller compares the location of the test holes with the desired hole processing locations using the image taken, the control value of the laser scanner 134 in accordance with the error (S4).

Further, in the substrate on which a plurality of work sections are defined, an object work section for which the holes will be first processed are defined (S6). The work sections of the substrate 100 may vary in accordance with the designer's intension.

Further, when the object work section of the work region is determined on the substrate 100, the stage unit 110 moves such that the object work section of the substrate 100 is positioned at the image pick-up location of the first image pick-up camera 142 (S7).

The image pick-up location means a location where the first image pick-up camera 142 can entirely take an image of the object work section of the substrate 100.

Subsequently, the first image pick-up camera 142 takes an image of the object work section of the substrate 100 (S8).

At this point, the image of the object work section is used to analyze a location error by comparing the pattern on the object work section with the pattern of the processing location data.

Although the error of the processing location data is corrected through the pattern matching process in this embodiment, the present invention is not limited to this. For example, the processing location data may be corrected through a pre-determined shape that is pre-marked on the object work section in accordance with the designer's intension. Alternatively, a method for analyzing by extracting a comparable shape such as a circular shape from a pattern formed on the substrate may be used.

In addition, the controller analyzes the image taken by the first image pick-up camera 142 and corrects the processing location data (S9).

When the correction of the processing location data is completed, the stage unit 110 moves such that the substrate 100 moves to a work location where the holes of the object work section will be processed in response to the scanner unit 130.

At this point, since the stage unit 110 moves in accordance with the location command output from the controller to move the substrate 100 to the work location, there may be an error caused by the limitation of the mechanical location accuracy.

Accordingly, the work location is corrected again in accordance with the processing location image taken by the first image pick-up camera (S10).

Therefore, the substrate 100 is aligned again to the corrected work location by the stage unit 110 and the holes are processed in the object work section in accordance with the corrected processing location data (S11).

At this point, although the processing location data is corrected only for the object work section of the entire work region, the present invention is not limited to this. For example, the hole process may be performed after correcting the processing location data for the entire work region.

When the holes in the object work section starts being processed by the scanner unit 130, the controller defines a section adjacent to the current processing work section as a new object work section (S12).

Further, when the new object work section is defined, the controller determined if all of the work sections of the work region of the substrate are processed (S13). When it is determined that all of the work sections of the work region of the substrate are processed, the processing work is finished. At this point, it is also possible that the processing work is finished by determining if there is undetermined object work section.

However, when it is determined that any one of the work sections of the work region of the substrate is not processed, the above process for correcting the processing location data for the object work section is performed.

Since the above works are almost simultaneously performed, the hole processing is performed at one section and at the same time the image pick-up processing is performed at another section to correct the processing location data.

In this embodiment, one work section adjacent to the current work section is defined as the object work section. However, when a plurality of image pick-up cameras are used, it is also possible to define a plurality of work sections as object work sections.

In addition, the process for taking the image using the first image pick-up camera 142 and correcting the processing location data using the image taken is performed again for the sections defined as the object work sections (S8). Therefore, the above correction processes are performed again for the object work sections and the hole processing in accordance with the correction starts to define the object work sections as the processing work sections (S9-S12).

At this point, the holes are processed in the processing work section by the scanner unit and, at the same time, the correction by the first image pick-up camera 142 is performed for the object work section.

In the prior art laser processing apparatus, a hole location error occurs due to a variety of factors.

The major factors causing the location error includes a case where the preset processing location data are different from the locations of the holes that will be actually formed on the substrate, a case where there is an error in the stage unit that should accurately move the substrate to a reference point of the processing location data, and a case where there is an error in the laser scanner.

Therefore, when the holes are inaccurately formed due to the errors, the reliability of the products is deteriorated. In the worst case, the holes may be processed at totally undesired locations and thus the products may not be used.

However, according to the embodiments of the present invention, the camera unit takes images of the work sections and the processing location data is corrected to the actual hole locations on the substrate through the images taken. In addition, the error caused the mechanical limitations of the stage unit can be also corrected. Further, by forming the test holes in the dummy region, the control value can be corrected in accordance with the error of the laser scanner.

As a result, since the likelihood errors in the laser processing apparatus can be corrected, the holes can be more accurately formed in the substrate.

Further, when the locations of the holes formed on the substrate are different from the designed locations of the holes, each process can be checked and thus the major factors causing the errors can be easily corrected.

Figure 6:
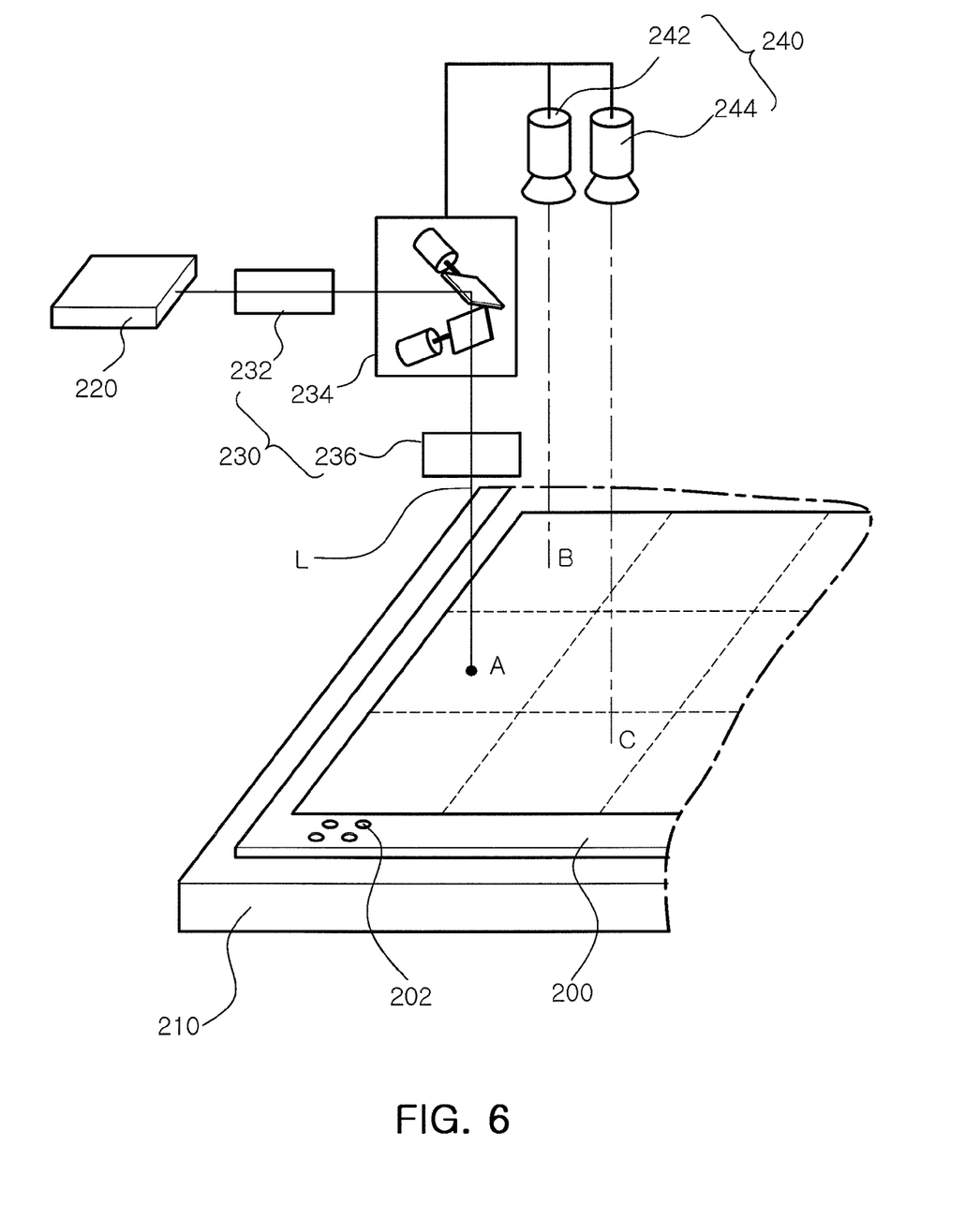
FIG. 6 is a schematic view of a laser processing apparatus according to another embodiment of the present invention.

FIG. 6 is a schematic view of a laser processing apparatus according to another embodiment of the present invention.

Referring to FIG. 6, the laser processing apparatus includes a state unit 210, a laser beam oscillating unit 220, a scanner unit 230, and a camera unit 240.

A substrate 200 is disposed on the stage unit 210 that is electrically connected to a stage driving unit 212 that moves the stage unit 210 in X and Y-directions.

In addition, the stage unit 210 may be designed to as well as move in the X and Y-directions and rotate about a rotational axis at a predetermined angle such that the substrate 200 can be inclined.

The laser beam oscillating unit 220 generates laser beams Land oscillates the generated laser beams in a direction. The laser beams oscillated in the direction sequentially passes through a first optical unit 232, a laser scanner 234, and a second optical unit 236 to be converted into laser beams for processing the holes in the substrate 200.

The scanner unit 230 is located on a laser beam path of the laser beams emitted from the laser oscillating unit 220. The scanner unit 230 includes the first optical unit 232, the laser scanner 234, and the second optical unit 236.

The first optical unit 232 includes a beam expander for expanding the laser beam into collimated light having a predetermined diameter and a homogenizer for reducing coherence of the laser beams. However, the present invention is not limited to this configuration. Any structures having the same functions will be possible.

The laser scanner 234 reflects the laser beams passing through the first optical unit 232 so that the laser beams can be directed toward the substrate. The laser scanner 234 changes a beam's traveling direction using a Galvano mirror. That is, by adjusting an angle of the Galvano mirror in accordance with a designer's intension, the beam's traveling direction can be changed to a desired direction.

The second optical unit 236 is disposed between the laser scanner 234 and the substrate 200. The second optical unit 236 converts an angle of the laser beams reflected from the laser scanner 234 into an angle that is perpendicular to the substrate 200. In addition, the second optical unit 236 functions to changes a spot size of the laser beams into a desired spot size.

The camera unit 240 includes a first image pick-up camera 242 and a second image pick-up camera 244.

The first image pick-up camera 242 is disposed above a first work section B that is adjacent to a processing work section A above which the laser scanner 234 operates.

The second image pick-up camera 244 is disposed above a second work section C that is diagonally adjacent to a processing work section A above which the laser scanner 234 operates.

Therefore, while the laser scanner processes holes in the processing work region A, a process for correcting the processing location data is simultaneously performed by the first image pick-up camera 242 taking an image of the first work section B and the second image pick-up camera 244 taking an image of the second work section C.

Accordingly, after the laser scanner 234 processes the holes in the first work section B, there is no need to perform the process for correcting the processing location data for the second work section C after stopping the processing of the holes. Therefore, the laser scanner 234 can continuously perform the hole processing and thus the work time can be reduced.

Since the stage unit 210, laser oscillating unit 220, and scanner unit 230 of this embodiment are identical to those of the embodiment of FIG. 1, the detail description thereof will be omitted herein.

While the present invention has been shown and described in connection with the exemplary embodiments, it will be apparent to those skilled in the art that modifications and variations can be made without departing from the spirit and scope of the invention as defined by the appended claims.

What is claimed is:

1. A laser processing method comprising:
   moving a substrate having a plurality of work sections such that a camera unit can take an image of an object work section in the substrate, which will be processed;
   correcting a processing location data corresponding to the object work section according to the image taken by the camera unit;

processing a hole in the object work section by controlling a laser oscillating unit and a scanner unit in accordance with the corrected processing location data; and taking an image of another work section adjacent to the object work section by the camera unit as the scanner unit processes the holes in the object work section to correct the processing location data;

wherein the camera unit is spaced apart from the scanner unit, and wherein the correcting of the processing location data regarding the object work section is performed by comparing a pattern formed on the object work section in the image with an initially designed pattern of the substrate.

2. The laser processing method of claim 1, further comprising correcting a location of the substrate by verifying an initial location of the work section using the image taken by the camera unit.

3. The laser processing method of claim 1, further comprising:

processing test holes in a dummy region of the substrate using the scanner unit; and correcting an error of the scanner unit by comparing locations of the test holes in the image, which is taken by the camera unit, with desired locations.

4. The laser processing method of claim 1, wherein the processing of the holes in the object work section comprises:

defining a work section adjacent to a current work section in which the holes are being processed as the object work section; and determining if all of the work sections are processed.

5. The laser processing method of claim 4, wherein, when it is determined that any one of the work sections is not processed, an image of the defined object work section is taken to correct the processing location data.

* * * * *